US012664536B2

(12) United States Patent
Vudathu et al.

(10) Patent No.: US 12,664,536 B2
(45) Date of Patent: Jun. 23, 2026

(54) SYSTEMS AND METHODS FOR USING LIMITED USE TOKENS BASED ON RESOURCE SPECIFIC RULES

(71) Applicant: JPMORGAN CHASE BANK, N.A., New York, NY (US)

(72) Inventors: Raghu Vudathu, Downingtown, PA (US); Gerardo Gean, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 129 days.

(21) Appl. No.: 18/060,828

(22) Filed: Dec. 1, 2022

(65) Prior Publication Data

US 2024/0185222 A1    Jun. 6, 2024

(51) Int. Cl.
*G06Q 20/36* (2012.01)
*H04L 9/32* (2006.01)

(52) U.S. Cl.
CPC ..... *G06Q 20/3672* (2013.01); *G06Q 20/3678* (2013.01); *H04L 9/3213* (2013.01); *H04L 9/3228* (2013.01); *G06Q 2220/00* (2013.01)

(58) Field of Classification Search
None
See application file for complete search history.

(56) References Cited

U.S. PATENT DOCUMENTS 7,415,439 B2 * 8/2008 Kontio ................. G06Q 20/367
705/52

8,600,830 B2 * 12/2013 Hoffberg ............ G06Q 30/0282
705/14.71
10,650,621 B1 * 5/2020 King .................... G07C 5/0816
(Continued)

FOREIGN PATENT DOCUMENTS

WO    WO-2016036417 A1 *  3/2016 ........... G06Q 20/363
WO    WO-2021016219 A1 *  1/2021 ........... G06Q 20/065
WO    WO-2022178096 A1 *  8/2022 ........... G06Q 20/065

OTHER PUBLICATIONS

Loïc Lesavre et al. "Blockchain Networks: Token Design and Management Overview." (Feb. 2021). Retrieved online Jun. 24, 2024. https://nvlpubs.nist.gov/nistpubs/ir/2021/NIST.IR.8301.pdf (Year: 2021).*

(Continued)

*Primary Examiner* — James A Reagan
(74) *Attorney, Agent, or Firm* — GREENBERG TRAURIG LLP

(57) ABSTRACT

Systems and methods for using limited use tokens based on resource specific rules are disclosed. According to one embodiment, a method for minting limited use tokens may include: (1) receiving, at a token minting computer program and from a customer, a request to generate a limited use token for a third-party provider; (2) identifying, by the token minting computer program, use restrictions and/or limits on the limited use token using a trained machine learning engine, wherein the trained machine learning engine is trained with historical data; (3) minting, by the token minting computer program, the limited use token; (4) associating, by the token minting computer program, the use restrictions and/or limits with the limited use token and storing the association in a database; and (5) sending, by the token minting computer program, the limited use token to the third-party provider.

19 Claims, 4 Drawing Sheets

(56) References Cited

U.S. PATENT DOCUMENTS

| | | | | |
|---|---|---|---|---|
| 10,943,273 | B2 * | 3/2021 | Hoffberg | G06Q 30/0207 |
| 11,144,914 | B2 * | 10/2021 | Gomes | G06Q 20/38215 |
| 11,232,655 | B2 * | 1/2022 | Bhattacharyya | H04L 67/12 |
| 11,410,163 | B2 * | 8/2022 | Kikinis | H04L 9/3239 |
| 11,488,139 | B2 * | 11/2022 | Runyan | G06Q 20/325 |
| 11,556,921 | B2 * | 1/2023 | Senter | G06Q 20/0658 |
| 11,615,406 | B2 * | 3/2023 | Wang | G06Q 20/3278 |
| | | | | 705/76 |
| 11,790,413 | B2 * | 10/2023 | Hoffberg | G07F 17/323 |
| | | | | 705/14.1 |
| 2015/0254646 | A1 * | 9/2015 | Harkey | G06Q 20/385 |
| | | | | 705/67 |
| 2015/0254648 | A1 * | 9/2015 | Clements | G06Q 20/367 |
| | | | | 705/41 |
| 2015/0254657 | A1 * | 9/2015 | Bondesen | G06Q 20/405 |
| | | | | 705/44 |
| 2015/0254665 | A1 * | 9/2015 | Bondesen | G06Q 20/367 |
| | | | | 705/44 |
| 2017/0091759 | A1 * | 3/2017 | Selfridge | G06Q 20/385 |
| 2017/0193498 | A1 * | 7/2017 | Metral | G06Q 20/326 |
| 2018/0262503 | A1 * | 9/2018 | Dawson | H04L 9/3239 |
| 2018/0295120 | A1 * | 10/2018 | Dawson | H04L 63/0884 |
| 2019/0347640 | A1 * | 11/2019 | Runyan | G06Q 20/385 |
| 2020/0097963 | A1 * | 3/2020 | Gomes | G06Q 20/38215 |
| 2020/0111081 | A1 * | 4/2020 | Kallugudde | G06Q 20/3672 |
| 2020/0250657 | A1 * | 8/2020 | Senter | G06Q 20/389 |
| 2021/0004792 | A1 * | 1/2021 | Kikinis | G06Q 20/3827 |
| 2021/0073804 | A1 * | 3/2021 | Kikinis | G06Q 20/3276 |
| 2021/0133740 | A1 * | 5/2021 | Wang | G06Q 20/3278 |
| 2022/0067710 | A1 * | 3/2022 | Yantis | G06Q 20/405 |
| 2022/0300952 | A1 * | 9/2022 | Senter | G06Q 20/3829 |
| 2022/0351186 | A1 * | 11/2022 | Quigley | H04L 63/12 |
| 2022/0351193 | A1 * | 11/2022 | Quigley | G06Q 20/065 |
| 2022/0351194 | A1 * | 11/2022 | Quigley | H04L 9/50 |
| 2022/0351195 | A1 * | 11/2022 | Quigley | H04L 9/50 |
| 2022/0391887 | A1 * | 12/2022 | Jakobsson | H04L 9/3239 |
| 2023/0009304 | A1 * | 1/2023 | Jakobsson | G06Q 30/0241 |

OTHER PUBLICATIONS

Jose Luis Miralles-Quiros and Maria Mar Miralles-Quiros. "Mathematics, Cryptocurrencies and Blockchain Technology." @ 2022. Retrieved online Jun. 24, 2024. https://www.mdpi.com/bookfiles/book/5754/Mathematics_Cryptocurrencies_and_Blockchain_Technology.pdf (Year: 2022).*

* cited by examiner

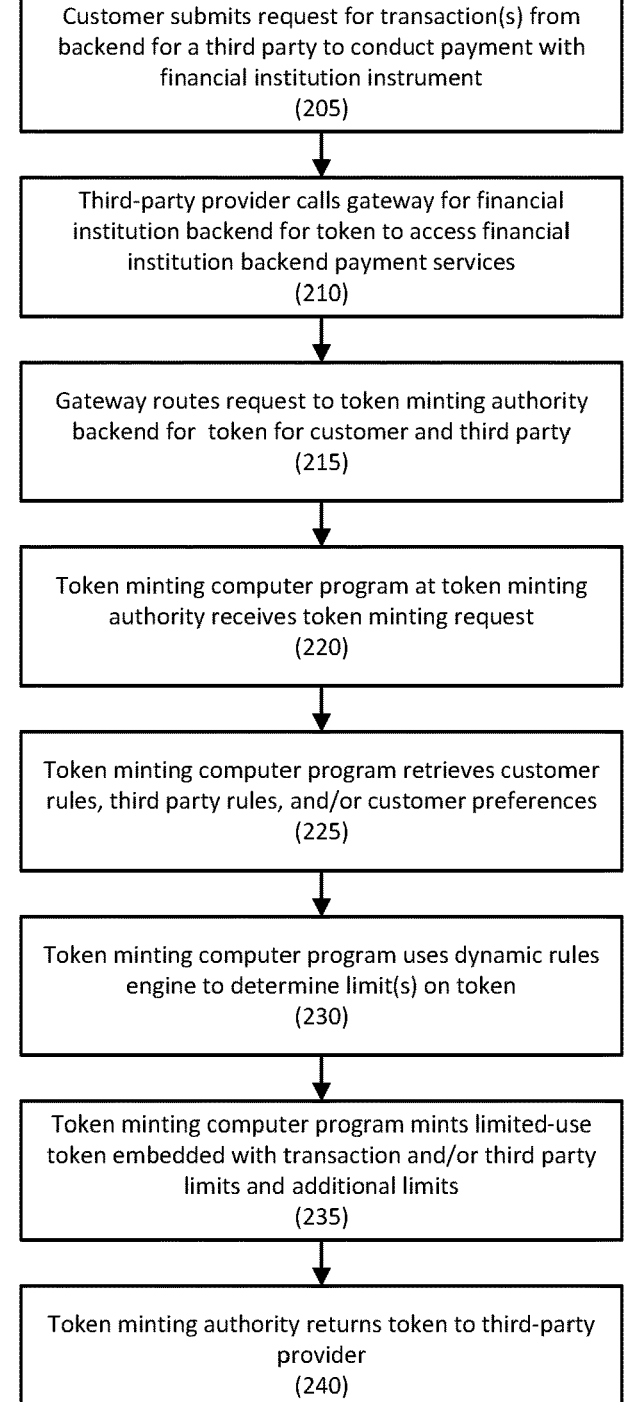

Customer submits request for transaction(s) from backend for a third party to conduct payment with financial institution instrument
(205)

Third-party provider calls gateway for financial institution backend for token to access financial institution backend payment services
(210)

Gateway routes request to token minting authority backend for token for customer and third party
(215)

Token minting computer program at token minting authority receives token minting request
(220)

Token minting computer program retrieves customer rules, third party rules, and/or customer preferences
(225)

Token minting computer program uses dynamic rules engine to determine limit(s) on token
(230)

Token minting computer program mints limited-use token embedded with transaction and/or third party limits and additional limits
(235)

Token minting authority returns token to third-party provider
(240)

FIGURE 2

Third-party provider makes payment call to gateway
including transaction and limited token
(305)

Limits for token identified
(310)

Are transaction
details within scope of limits?
(315)

YES

NO

Gateway routes transaction to execution resource
(320)

Return transaction denial to third party backend
(330)

Execution engine executes transaction
(325)

SYSTEMS AND METHODS FOR USING LIMITED USE TOKENS BASED ON RESOURCE SPECIFIC RULES

BACKGROUND OF THE INVENTION

1. Field of the Invention

Embodiments generally relate to systems and methods for using limited use tokens based on resource specific rules.

2 Description of the Related Art

OAuth is a common integration method used by a resource owner to provide third parties with access to the resources. Using oAuth, the resource owner provides or issues tokens (e.g., authentication and authorization tokens, access and refresh tokens, etc.) that are valid for a certain duration (e.g., 15 minutes or longer) to the consuming third party. The third party then sends the tokens with a request payload (encrypted or in plain text) to consume the resource to the resource owner. Before processing the request, the resource owner validates the tokens and if valid, processes the request and sends the response.

Because of the tokens are valid for a period of time, if a malicious user is able to access the tokens, it may cause damage to the resource owner and the resources.

SUMMARY OF THE INVENTION

Systems and methods for using limited use tokens based on resource specific rules are disclosed. According to one embodiment, a method for minting limited use tokens may include: (1) receiving, at a token minting computer program and from a customer, a request to generate a limited use token for a third-party provider; (2) identifying, by the token minting computer program, use restrictions and/or limits on the limited use token using a trained machine learning engine, wherein the trained machine learning engine is trained with historical data; (3) minting, by the token minting computer program, the limited use token; (4) associating, by the token minting computer program, the use restrictions and/or limits with the limited use token and storing the association in a database; and (5) sending, by the token minting computer program, the limited use token to the third-party provider.

In one embodiment, the limited use token is restricted to transactions with the third-party provider within a limited period of time.

In one embodiment, the limited use token is restricted to transactions within a geographical area within a limited period of time.

In one embodiment, the limited use token is restricted to a type of transaction within a limited period of time.

In one embodiment, the limited use token is restricted to transactions associated with an event.

In one embodiment, the method may also include sending, by the token minting computer program, the limited use token to an electronic wallet for the customer.

In one embodiment, the method may also include: receiving, at a transaction authorization engine, a transaction request from the third-party provider comprising the limited use token and a transaction description; retrieving, by the transaction authorization engine and from the database, the use restrictions and/or limits from the database; determining, by the transaction authorization engine, that the transaction description is within the use restrictions and/or limits; and authorizing, by the transaction authorization engine, the transaction request.

In one embodiment, the method may also include receiving, at a transaction authorization engine, a transaction request from the third-party provider comprising the limited use token and a transaction description; retrieving, by the transaction authorization engine, the use restrictions and/or limits from the database; determining, by the transaction authorization engine, that the transaction description is not within the use restrictions and/or limits; and denying, by the transaction authorization engine, the transaction request.

In one embodiment, the use restrictions and/or limits are embedded within a field of the limited use token.

According to another embodiment, a system may include: a user electronic device associated with a customer executing a user computer program that generates a request to generate a limited use token for one of a plurality of third-party providers; and a computer program executing a token minting computer program and a trained machine learning engine that receives the request, identifies use restrictions and/or limits on the limited use token using the trained machine learning engine, wherein the trained machine learning engine is trained with historical data, mints the limited use token, associates the use restrictions and/or limits with the limited use token and stores the association in a database, and sends the limited use token to the third-party provider.

In one embodiment, the limited use token is restricted to transactions with the third-party provider within a limited period of time.

In one embodiment, the limited use token is restricted to transactions within a geographical area within a limited period of time.

In one embodiment, the limited use token is restricted to a type of transaction within a limited period of time.

In one embodiment, the limited use token is restricted to transactions associated with an event.

In one embodiment, the token minting computer program sends the limited use token to an electronic wallet for the customer.

In one embodiment, the system may also include a transaction authorization engine that receives a transaction request from one of the plurality of third-party providers comprising the limited use token and a transaction description, retrieves the use restrictions and/or limits from the database, determines that the transaction description is within the use restrictions and/or limits, and authorizes the transaction request.

In one embodiment, transaction authorization engine receives a transaction request from one of the plurality of third-party providers comprising the limited use token and a transaction description, retrieves the use restrictions and/or limits from the database, determines that the transaction description is not within the use restrictions and/or limits, and denies the transaction request.

In one embodiment, the use restrictions and/or limits are embedded within a field of the limited use token.

According to another embodiment, a non-transitory computer readable storage medium, including instructions stored thereon, which when read and executed by one or more computer processors, cause the one or more computer processors to perform steps comprising: receiving, from a customer, a request to generate a limited use token for a third-party provider; identifying, use restrictions and/or limits on the limited use token using a trained machine learning engine, wherein the trained machine learning engine is trained with historical data; minting the limited use token; associating the use restrictions and/or limits with the limited use token and storing the association in a database; and sending the limited use token to the third-party provider.

In one embodiment, the computer readable storage medium may also include instructions stored thereon, which when read and executed by one or more computer processors, cause the one or more computer processors to perform steps comprising: receiving a transaction request from the third-party provider comprising the limited use token and a transaction description; retrieving, from the database, the use restrictions and/or limits from the database; determining that the transaction description is within the use restrictions and/or limits and authorizing the transaction request, or determining that the transaction description is not within the use restrictions and/or limits and denying the transaction request.

BRIEF DESCRIPTION OF THE DRAWINGS

For a more complete understanding of the present invention, the objects and advantages thereof, reference is now made to the following descriptions taken in connection with the accompanying drawings in which:

FIG. 2 depicts a method for minting limited use tokens based on resource specific rules according to an embodiment;

DETAILED DESCRIPTION OF PREFERRED EMBODIMENTS

Embodiments are directed to systems and methods for using limited use tokens based on resource specific rules.

Embodiments may prevent damage caused by a malicious user by issuing limited use tokens, such as limited use access and limited use refresh tokens. For example, when a resource owner issues tokens to the third party (using, for example, a standard process), the resource owner may execute certain rules to generate token(s) with appropriate use restrictions or limitations.

In embodiments, the tokens may be specific to a dollar amount, to one or more transactions, to one or more merchants, to one or more customer profiles, combinations, etc. For example, a token may be valid for $50, a token may be valid for five transactions, a token may be valid for five transactions, each valid for at most $10 each, a token for delivery service may have a limit of $50, a token issued to a wallet provider may have a limit of $500. These limits are exemplary only; other limits and types of limits may be used as is necessary and/or desired.

The limits may vary based on, for example, a customer profile, the customer's credit history, the customer's risk scores, a location of access, time of access, number of activities in a specific duration of time (e.g., short duration, long duration), etc. Embodiments may include an artificial intelligence and/or a trained machine learning engine that may dynamically update the rules based on, for example, the customer data, transactions, merchant information, etc.

In embodiments, the rules may also be specific to a merchant or a type of merchant. For example, tokens issued to ridesharing merchants may have lower dollar and transaction limits, whereas tokens issued to a merchant with which the customer often shops may have higher limits.

Embodiments may reduce fraud and limit exposure to the customer in the event of an account take over (ATO) or similar. For example, when a bad actor acquires access to the customer account, the bad actor often looks for ways to divert the value under that account to the bad actor's account. By restricting the token, embodiments proactively prevent the losses that might occur under ATO or fraud situations, which limits the impact of the financial damage to the financial institute and the customer Although embodiments may be described in the context of oAuth tokens, it should be noted that embodiments are not limited to oAuth tokens and other types of tokens may be used as is necessary and/or desired.

Figure 1:
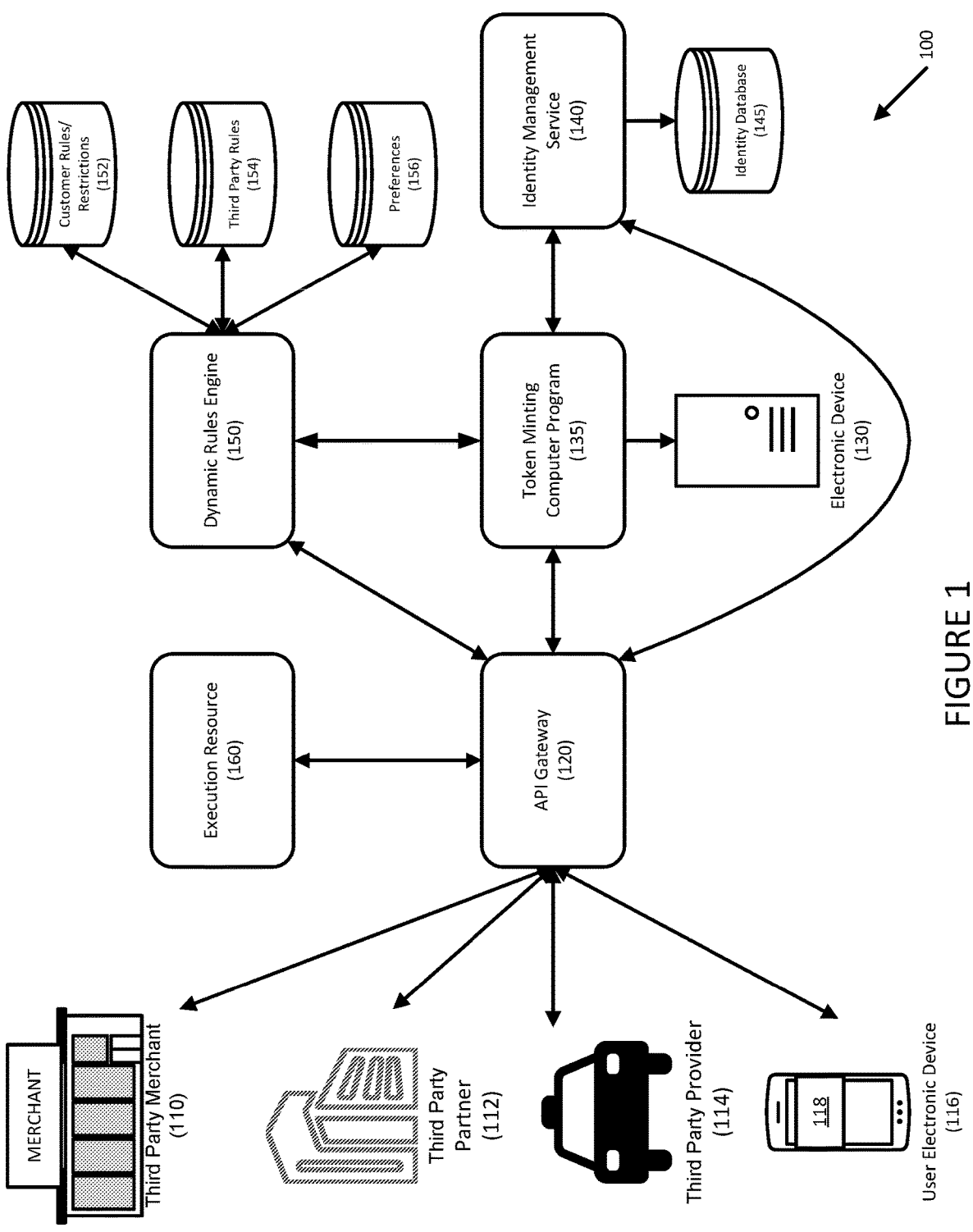
FIG. 1 depicts a system for using limited use tokens based on resource specific rules is disclosed according an embodiment.

Referring to FIG. 1, a system for using limited use tokens based on resource-specific rules is disclosed according to an embodiment. System 100 may include providers of goods or services (e.g., third party merchant 110, third party partner 112, third-party provider 114, etc.), electronic device 130 executing token minting computer program 135, identity management service 140, and dynamic rules engine 150. Providers 110, 112, 114 may interface with token minting computer program 135 via a gateway or any software or hardware appliance that can host an end point or an application/network load balancer that can route the request to an API gateway, for example Application Programming Interface (API) gateway 120. API gateway 120 may expose token minting computer program 135 to providers 110, 112, 114.

Providers 110, 112, 114 may each include a provider backend (not shown) that may communicate with API gateway 120.

In one embodiment, providers 110, 112, or 114 may request one or more tokens from token minting computer program 135 via API gateway 120. In another embodiment, a user using user electronic device 116 executing computer program or application 118 may request one or more tokens from token minting computer program 135 via API gateway 120 or directly from token minting computer program 135. In one embodiment, the user may request the one or more tokens on behalf of providers 110, 112, and/or 114, and may provide the token(s) to the appropriate provider 110, 112, and/or 114.

User electronic device 116 may be any suitable electronic device, including computers (e.g., workstations, desktops, laptops, notebooks, tablets, etc.), smart devices (e.g., smart phones, smart watches, etc.), Internet of Things (IoT) devices, etc. Computer program or application 118 may also provide a user interface, such as virtual reality, augmented reality, etc. that may present a virtual or augmented environment in which the user may select one or more provider 110, 112, 114 and may request a token for the selected provider(s).

Computer program or application 118 may also leverage biometrics so that a user may be pre-authenticated before requesting a token to provider 110, 112, 114. In addition, the user may be re-authenticated when seeking use the token with one of the providers 110, 112, 114.

Electronic device 130 may be any suitable electronic device, including servers (physical and/or cloud), workstations, desktops, etc. Electronic device 130 may execute a computer program, such as token minting computer program 135. Token minting computer program 135 may interface with dynamic rules engine 150, which may apply one or more of customer rules or use restrictions from customer rules/restrictions database 152, third party rules from third party rule database 154, and preferences from preferences database 156. The preferences may be for the customer or for the financial institution. For example, the financial institution may include add preferences rules based on tenure. Customer may set preferences based on travel, the type of transaction, etc.

Although databases 152, 154, and 156 are depicted as separate databases, it should be understood that a two or more of these databases may be combined, or additional databases may be provided.

Dynamic rules engine 150 may receive a token request from token minting computer program 135 and may identify and apply one or more sets of rules or limits for token minting computer program to mint a token with appropriate use restrictions limitations, such as merchant-based restrictions, dollar restrictions, number of transactions limitations, geographic restrictions, combinations, etc. In one embodiment, dynamic rules engine 150 may be a trained machine learning engine that identifies the appropriate use restriction(s) for the token based on historical transaction data for the user as well as other users.

Dynamic rules engine 150 may further validate tokens issued by token minting computer program 135, invalidate tokens issued by token minting computer program 135, dynamically change the use restrictions or limitations on the tokens, etc.

In order to conduct a transaction with the token, provider 110, 112, 114 may provide the token and transaction details to API gateway 120, which may route the token and transaction details to execution resource 160. Execution resource 160 may be resource, such as a transaction authorization engine, a money moving engine, a payment system, etc. that executes a transaction or action.

In one embodiment, execution resource 160 may not be engaged until a requested action involving a limited use token is confirmed to be within the use restrictions and/or limits embedded within or associated with the limited use token. Thus, embodiments save processing performed by execution resource 160 until it is needed.

Execution resource 160 may be associated with a financial institution that issued the payment instruction associated with the token.

API gateway 120 may retrieve, via dynamic rules engine 150, limits or use restrictions embedded in the token, or that are mapped to the token from, for example, customer rules/restrictions database 152. It may further retrieve any preferences for the customer from preferences database 156. If the transaction is within the use restrictions and/or limits, API gateway 120 may route the transaction to execution resource 160 for processing. If the transaction is not within the use restrictions of limits, API gateway 120 may reject the transaction, thereby not engaging execution resource 160. For example, API gateway 120 may return an error.

Identity management service 140 may validate the identity of provider 110, 112, 114 and/or the customer using identity database 145. Identity management service 140 may authenticate the customer before minting and issuing tokens.

Referring to FIG. 2, a method for minting limited use tokens based on resource specific rules is disclosed according to an embodiment.

In step 205, a customer may submit a request for one or more transaction(s) from a backend for a third-party provider, such as a good or service provider, to conduct a payment for a transaction using a financial institution instrument. In one embodiment, the transaction may be a pending transaction, or it may be an anticipated transaction. In one embodiment, the transaction may involve recurring transactions, or multiple transactions (e.g., the token may be "open" for multiple transactions with a single merchant, such as with a hotel during a stay).

For example, the token may be an oAuth token.

In one embodiment, the customer may submit the request directly to an API gateway using, for example, a computer program or application executed by a user electronic device.

In one embodiment, the transaction may involve an execution resource, such as a transaction authorization engine, a money moving engine, a payment system, etc.

In step 210, the third-party provider may call an API exposed by an API Gateway for a financial institution backend and may request a token to access financial institution backend payment services.

In step 215, the API gateway may route the request to a token minting authority backend to mint the token for the customer and the third-party provider.

In step 220 the token minting computer program at the token minting authority may receive the token minting request, and, in step 225, may retrieve rules, such as customer rules, third party rules, and/or customer preferences.

In step 230, the token minting computer program may use a dynamic rules engine to apply the rules and determine use restriction(s) or limit(s) on the token. In one embodiment, the dynamic rules engine may be a trained machine learning engine that is trained on historical data, such a historical transaction data, for the customer, other customers, etc. The limits may include merchant-based restrictions, dollar restrictions, number of transactions limitations, geographic restrictions, combinations, etc.

In step 235, the token minting computer program may mint one or more limited-use tokens. In one embodiment, the tokens may be embedded with the use restrictions and/or limits, as well as customer information. For example, the use restrictions and/or limits may be stored within a field in the token. This avoids having to query another system to validate the use limits or restrictions, thereby reducing latency in high volume systems.

In another embodiment, the use restrictions and/or limits may be associated with the token and may be stored in a database, such as a rules/restrictions database. For example, the use restrictions or limits may be mapped to the token, the customer, combinations, etc. The use restrictions and/or limits may be considered and applied in a transaction authorization process for a transaction involving the token.

In step 240, the token minting authority may return the token to the third-party provider. In one embodiment, the token may also be provided to the user's electronic device and stored in memory, in an electronic wallet application, etc.

Figure 3:
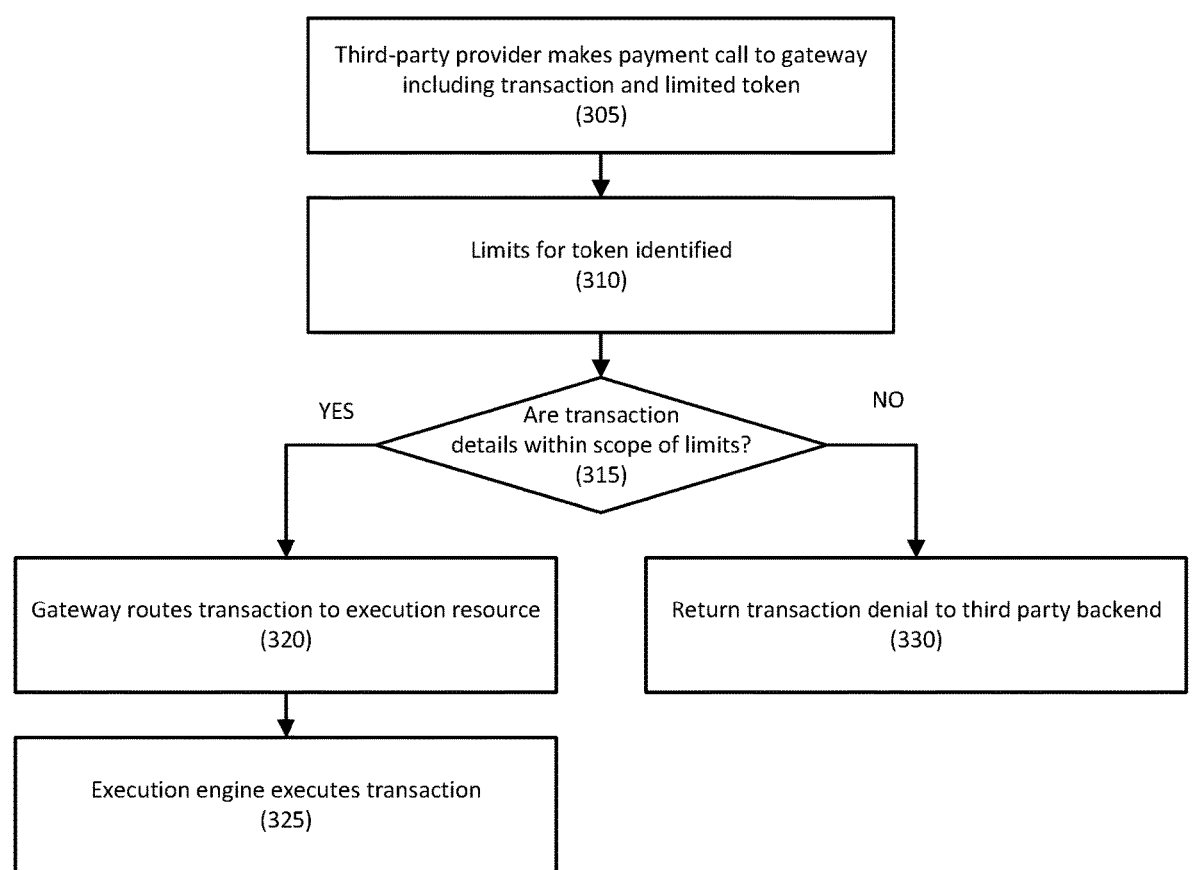
FIG. 3 depicts a method for using limited use tokens based on resource specific rules according to an embodiment.

Referring to FIG. 3, a method for using limited use tokens based on resource specific rules is disclosed according to another embodiment In step 305, a third-party provider, such as a merchant, a third-party partner, etc., may make a payment call to a gateway, such as an API gateway, including a transaction and a limited user token, such as an oAuth token. The limited use token may be embedded with one or more use restrictions and/or limits, or may be associated with one or more use restriction or limits that may be stored in a database.

In step 310, the token use restrictions or limits may be identified. For example, a dynamic rules engine may extract the use restrictions or limits from the token, or it may retrieve them from a database. For example, the dynamic rules engine may retrieve the use restrictions or limits from, for example, a database (e.g., a rules/restrictions database), or it may extract them from the token itself.

In step 315, the dynamic rules engine may compare transaction details to the use restrictions or limits for the token. If the transaction is within the use restrictions or limits in step 320, the gateway may route the transaction to an execution resource, such as a transaction authorization engine, a money moving engine, a payment system, etc., which, in step 325, may execute the transaction. For example, the execution engine may decision the transaction and may issue a payment, move funds, etc.

If the transaction is not within the limits, in step 330, the gateway may return denial of the transaction to the third-party provider.

Figure 4:
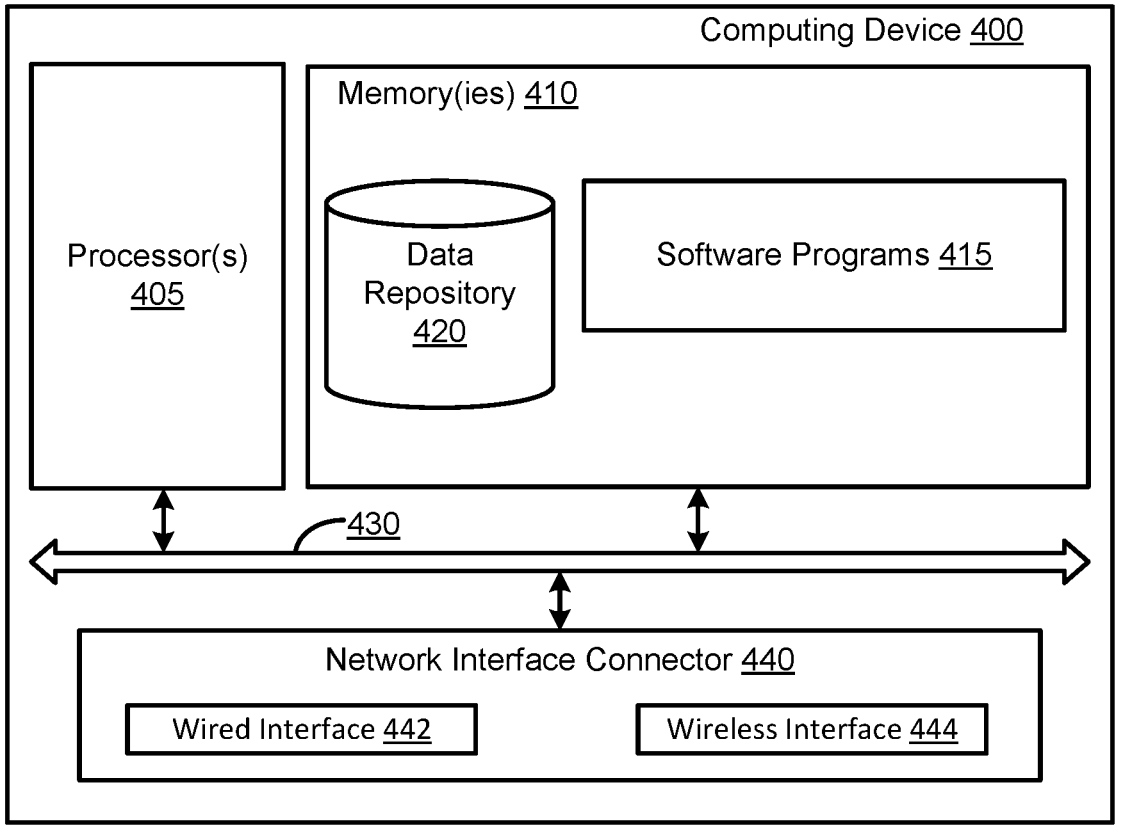
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Although several embodiments have been disclosed, the embodiments are not exclusive, and features disclosed in one embodiment may be used with other embodiments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, at a token minting computer program and from a customer, a request to generate a limited use payment token that is associated with a financial instrument for a third-party provider;

identifying, by the token minting computer program, payment restrictions on the limited use payment token using a trained machine learning engine, wherein the trained machine learning engine is trained with historical payment data, and wherein the payment restrictions restrict the use of the payment token as payment in transactions within a geographical area;

minting, by the token minting computer program, the limited use payment token;

associating, by the token minting computer program, the payment restrictions with the limited use payment token and storing the association in a database; and sending, by the token minting computer program, the limited use payment token to the third-party provider.

2. The method of claim 1, wherein the payment restrictions further restrict the limited use payment token to a type of transaction or to an event.

3. The method of claim 1, wherein the payment restrictions further restrict the limited use payment token to transactions associated with an event.

4. The method of claim 1, further comprising:

receiving, at a transaction authorization engine, a transaction request from the third-party provider comprising the limited use payment token and a transaction description;

retrieving, by the transaction authorization engine and from the database, the payment restrictions from the database;

determining, by the transaction authorization engine, that the transaction description is within the payment restrictions; and authorizing, by the transaction authorization engine, the transaction request.

5. The method of claim 1, further comprising:

receiving, at a transaction authorization engine, a transaction request from the third-party provider comprising the limited use payment token and a transaction description;

retrieving, by the transaction authorization engine, the payment restrictions from the database;

determining, by the transaction authorization engine, that the transaction description is not within the payment restrictions; and denying, by the transaction authorization engine, the transaction request.

6. The method of claim 1, wherein the payment restrictions are embedded within a field of the limited use payment token.

7. A system, comprising:

a user electronic device associated with a customer executing a user computer program that generates a request to generate a limited use payment token that is associated with a financial instrument for one of a plurality of third-party providers; and a computer program executing a token minting computer program and a trained machine learning engine that receives the request, identifies payment restrictions on the limited use payment token using the trained machine learning engine, wherein the trained machine learning engine is trained with historical payment data, and wherein the payment restrictions restrict the use of the payment token to transactions within a geographical area, mints the limited use payment token, associates the payment restrictions with the limited use payment token and stores the association in a database, and sends the limited use payment token to the third-party provider.

8. The system of claim 7, wherein the payment restrictions further restrict the limited use payment token to transactions within a limited period of time after minting.

9. The system of claim 7, wherein the payment restrictions further restrict the limited use payment token to a type of transaction.

10. The system of claim 7, wherein the payment restrictions restricts the limited use payment token to transactions associated with an event.

11. The system of claim 7, further comprising:

a transaction authorization engine that receives a transaction request from one of the plurality of third-party providers comprising the limited use payment token and a transaction description, retrieves the payment restrictions from the database, determines that the transaction description is within the payment restrictions, and authorizes the transaction request.

12. The system of claim 7, further comprising:

a transaction authorization engine that receives a transaction request from one of the plurality of third-party providers comprising the limited use payment token and a transaction description, retrieves the payment restrictions from the database, determines that the transaction description is not within the payment restrictions, and denies the transaction request.

13. The system of claim 7, wherein the payment restrictions are embedded within a field of the limited use payment token.

14. A method, comprising:

receiving, at a token minting computer program and from a customer, a request to generate a limited use payment token that is associated with a financial instrument for a third-party provider;

identifying, by the token minting computer program, payment restrictions on the limited use payment token using a trained machine learning engine, wherein the trained machine learning engine is trained with historical payment data, and wherein the payment restrictions restrict the use of the payment token as payment in transactions for a limited period of time after minting;

minting, by the token minting computer program, the limited use payment token;

associating, by the token minting computer program, the payment restrictions with the limited use payment token and storing the association in a database; and sending, by the token minting computer program, the limited use payment token to the third-party provider.

15. The method of claim 14, wherein the payment restrictions restricts the limited use payment token to a type of transaction within a geographical area.

16. The method of claim 14, wherein the payment restrictions restricts the limited use payment token to transactions associated with an event.

17. The method of claim 14, further comprising:

receiving, at a transaction authorization engine, a transaction request from the third-party provider comprising the limited use payment token and a transaction description;

retrieving, by the transaction authorization engine and from the database, the payment restrictions from the database;

determining, by the transaction authorization engine, that the transaction description is within the payment restrictions; and authorizing, by the transaction authorization engine, the transaction request.

18. The method of claim 14, further comprising:

receiving, at a transaction authorization engine, a transaction request from the third-party provider comprising the limited use payment token and a transaction description;

retrieving, by the transaction authorization engine, the payment restrictions from the database;

determining, by the transaction authorization engine, that the transaction description is not within the payment restrictions; and denying, by the transaction authorization engine, the transaction request.

19. The method of claim 14, wherein the payment restrictions are embedded within a field of the limited use payment token.

\* \* \* \* \*